H. B. KEIPER.
BALL RETAINER AND SEPARATOR FOR THRUST BEARINGS.
APPLICATION FILED SEPT. 15, 1919.
1,353,044. Patented Sept. 14, 1920.
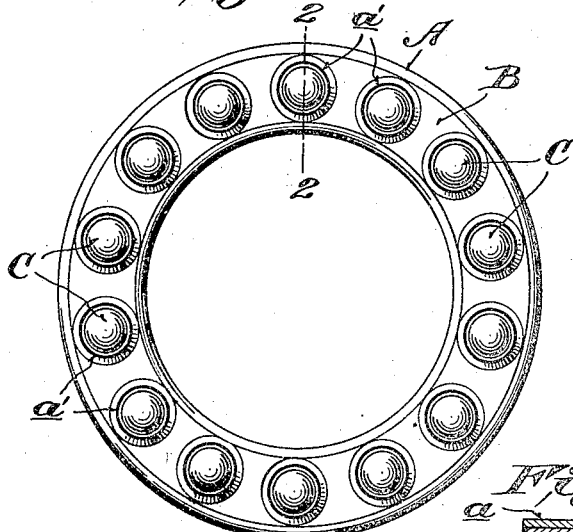
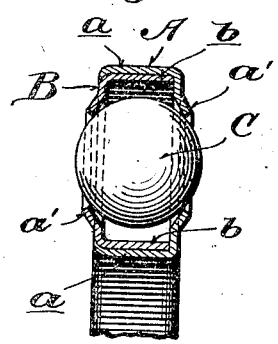
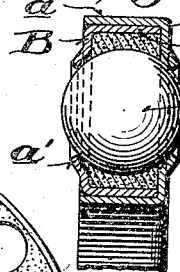
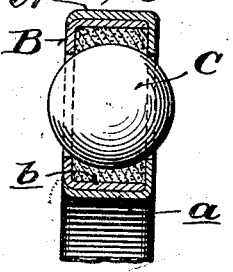
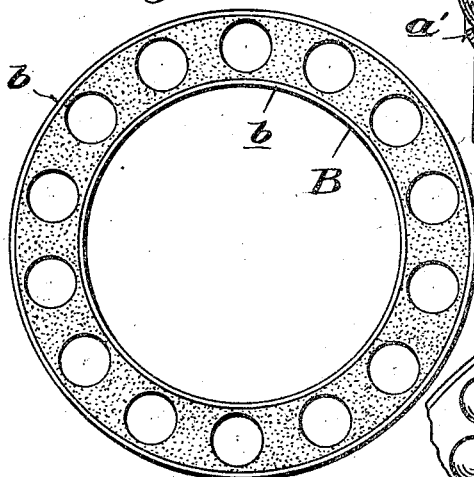
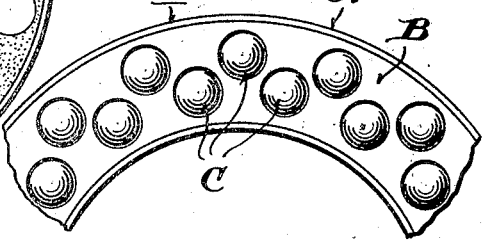

UNITED STATES PATENT OFFICE.

HENRY B. KEIPER, OF LANCASTER, PENNSYLVANIA.

BALL RETAINER AND SEPARATOR FOR THRUST-BEARINGS.

1,353,044.   Specification of Letters Patent.   Patented Sept. 14, 1920.

Application filed September 15, 1919. Serial No. 323,677.

*To all whom it may concern:*

Be it known that I, HENRY B. KEIPER, a citizen of the United States, residing at Lancaster, in the county of Lancaster and State of Pennsylvania, have invented certain new and useful Improvements in Ball Retainers and Separators for Thrust-Bearings; and I do hereby declare the following to be a full, clear, and exact description of the invention, such as will enable others skilled in the art to which it appertains to make and use the same.

The invention relates to anti-friction bearings such as are used in automobiles and other vehicles, and in various kinds of machines for resisting end thrust, and more particularly to devices for caging and holding the balls in separated relation in such manner as to prevent rolling contact of the balls when in use in the bearings and to prevent the balls from dropping out when the cage or retaining device is removed from the bearings.

The objects of the invention are to provide a simple and inexpensive ball retaining and separating device combining in its construction the elements of strength, efficiency and durability, and having means associated therewith for lubricating and distributing the lubricant evenly and uniformly over the surfaces of the balls and so constructed as to prevent the entrance of dust into the cage or separating device with consequent wear and injury to the bearings.

The invention will first be hereinafter more particularly described, with reference to the accompanying drawings, which are to be taken as a part of this specification, and then pointed out in the claims at the end of the description.

In said drawings

Figure 1 represents a side view of a thrust bearing embodying my invention;

Fig. 2 is a detail sectional view of the same taken on the line 2—2 of Fig. 1;

Fig. 3 is a side view of one of the plates of which the cage is composed containing a lubricating packing ring;

Fig. 4 is a detail sectional view of a modified form of the device shown in Fig. 1 with a lubricating packing ring inserted between the bearing rings;

Fig. 5 is a detail sectional view similar to Fig. 4 without flaring openings;

Fig. 6 is a detail fragmentary view of another modification showing a ball cage with openings for the balls arranged in staggered relation.

For the sake of clearness the device is illustrated on an enlarged scale, though the size may vary from a smaller to a larger size than that shown. A preferred form of the device, omitting the lubricating packing ring, is shown in Figs. 1 and 2, and a modified form with the lubricating packing ring included is shown in Figs. 4 and 5.

Referring to said drawings, in which the same reference letters are used to denote corresponding parts in different views, the letters A and B denote ring-shaped plates of different sizes, each having a series of apertures or circular openings therein spaced apart and adapted to hold a corresponding series of balls C, placed between the two plates and permit the balls to protrude in opposite directions through said openings with provision for free rotation of the balls thus confined in separated relation. The metal around the openings through which the balls protrude may be swaged and outwardly flaring as at $a'$, to enlarge the ball retaining space and permit greater freedom of movement of the balls confined between opposed outwardly flaring openings. Said plates are each formed with marginal, preferably annular flanges, $a$ and $b$, respectively, which extend substantially at right angles to the apertured ring toward the other plate. The flanges on one plate are fitted between and overlap the flanges of the other plate and the two plates may be held together with frictional contact between said flanges, though preferably, for greater security in preventing separation under normal conditions, the outer margin or edge of the peripheral flange on the larger plate may be swaged or bent over the peripheral flange or outer margin of the smaller plate, as shown in Figs. 2 and 5. The openings in the side plates may be arranged in circular form or in staggered relation, as shown in Figs. 1 and 6, respectively.

For the purpose of lubricating and distributing the lubricant over the surfaces of the balls I may place between the two plates, within or between the flanges of the smaller plate, an oiling device consisting of a ring-shaped packing of felt or other absorbent material having a series of apertures or circular openings therein spaced apart so as to coincide or register with the openings in the annular side plates when fitted between the two plates so that the balls are partially embedded in the soft felt or other packing material, and by saturating said packing with oil or other lubricant the rotating balls will carry the oil around and continuously lubricate the surfaces of the balls and the bearing surfaces with which the balls contact. The ring-shaped plates may be constructed of any suitable material, but preferably are struck up or pressed out of sheet steel or bronze.

The device constructed as described is adapted to effectually hold the balls and prevent dust from entering the cage, and the balls are effectually lubricated and adapted to distribute the lubricant over the wearing surfaces so as to reduce friction and wear and prolong the life of the bearing.

To adapt the rings to hold the balls in proper position to permit them to rotate freely and prevent movement of one ring toward the other beyond the desired limit, and to secure them firmly and immovably together, one or both of the flanges of the smaller ring should extend to and abut against the inner wall of the larger ring while the outer or peripheral flange of the larger ring should extend the full width of the outer flange of the smaller ring and preferably have its edge swaged or bent over the margin or outer edge of the smaller ring, as shown in Figs. 2 and 5, though the latter feature may not be essential in some cases, as the two rings may be sufficiently firmly held together by frictional contact, as shown in Fig. 4.

Having thus described my invention, what I claim as new and desire to secure by Letters Patent is—

1. A self-lubricating ball-retaining and separating device comprising two annular plates of different sizes, each having laterally projecting inner and outer marginal flanges extending toward the other plate and provided with a series of openings between its flanges arranged opposite a corresponding series of openings in the other plate, so as to confine between the two plates a series of balls projecting in opposite directions through oppositely disposed openings; the flanges of the larger plate overlapping the flanges of the smaller plate and having their outer edges swaged or bent over the margin of the smaller plate so as to secure the two plates and interposed balls together and prevent the plates from coming apart, and lubricating material filling the space between said flanges around said openings and encircling the balls.

2. A ball retainer for thrust ball bearings comprising a plurality of flat ring-shaped plates of different sizes each having inner and outer integral annular marginal flanges extending laterally at an angle thereto toward the other plate and a series of openings between its flanges, the openings in one plate being arranged opposite the openings in the other plate and the flanges on one plate arranged to overlap and embrace the flanges on the other plate and hold them together; said plates being adapted to confine therebetween an annular series of balls projecting in opposite directions through said openings, and a lubricating device consisting of a ring-shaped body of absorbent material adapted to be saturated with oil and having openings through it in which the balls are seated and project in opposite directions therefrom through oppositely disposed openings in said plates.

3. A ball retainer for thrust ball bearings comprising a plurality of flat ring-shaped plates of different sizes each having integral annular marginal flanges extending at right angles thereto toward the other plate and a series of openings between its flanges, the openings in one plate being arranged opposite the openings in the other plate and the flanges on one plate arranged in binding contact with the flanges on the other plate and serving to hold them together; said plates being adapted to confine therebetween an annular series of balls projecting in opposite directions through said openings; and means for surrounding and practically submerging the balls in oil or other lubricant; said means consisting of a ring-shaped body of absorbent material adapted to be saturated with oil and having openings therein in which the balls are seated and protrude in opposite directions through therefrom in opposite directions through oppositely disposed openings in said plates.

4. A thrust bearing comprising disk-like plates with balls therebetween projecting in opposite directions through oppositely disposed openings in said plates, and lubricating material filling the space between said plates around said openings and encircling the balls.

5. A ball retainer for thrust ball bearings comprising a plurality of ring-shaped plates of different sizes adapted to confine therebetween an annular series of balls projecting in opposite directions through openings in said plates and a packing ring of absorbent material arranged in the channels provided between said plates and having openings therein to receive the balls and adapted to contain oil or other lubricant in surrounding contact with the balls; said ring-shaped plates each having annular marginal flanges extending at an angle thereto toward the other plate and a series of openings between its flanges, the openings in one plate being arranged opposite the openings in the other plate and the flanges on one plate overlapping the flanges on the other and holding the two plates together.

6. A thrust bearing comprising a plurality of annular plates of different sizes secured together one within the other, and a series of balls between said plates projecting in opposite directions through openings therein; said plates each having marginal flanges extending therefrom substantially at right angles thereto toward the other plate and a series of openings between its flanges, the openings in one plate being arranged opposite the openings in the other plate and the flanges on the smaller plate arranged between the flanges on the larger plate, and a lubricating device consisting of a lubricant-saturated ring of absorbent material placed between said plates and having openings therein to receive the balls and surround them with lubricant.

In testimony whereof I affix my signature in the presence of two witnesses.

HENRY B. KEIPER.

Witnesses:
CHAS. E. RIORDAN,
CLINTON L. MARSHALL.